United States Patent

Kawashima et al.

[11] Patent Number: 6,137,027
[45] Date of Patent: Oct. 24, 2000

[54] SOLID WASTE TREATMENT AGENT AND TREATMENT METHOD OF SOLID WASTE

[75] Inventors: Masatake Kawashima; Takashi Ogawa; Kazuhiro Terada; Hiroyuki Okayama; Katsushi Sugiyama; Kazuo Hosoda; Masafumi Moriya, all of Tokyo, Japan

[73] Assignee: Miyoshi Yushi Kabushiki Kaisha, Tokyo, Japan

[21] Appl. No.: 09/247,548

[22] Filed: Feb. 10, 1999

[30] Foreign Application Priority Data

| Feb. 10, 1998 | [JP] | Japan | 10-044532 |
| Oct. 21, 1998 | [JP] | Japan | 10-318356 |
| Dec. 14, 1998 | [JP] | Japan | 10-375339 |

[51] Int. Cl.$^7$ .................................................. A62D 3/00
[52] U.S. Cl. .................. 588/236; 588/207; 588/224; 405/263; 423/10
[58] Field of Search .................................. 588/236, 256, 588/257, 224, 252, 207; 428/2; 405/128, 263, 271; 252/625; 423/10

[56] References Cited

U.S. PATENT DOCUMENTS

| 4,038,071 | 7/1977 | Di Bella | 75/108 |
| 4,144,152 | 3/1979 | Kitchens . | |
| 4,268,188 | 5/1981 | Bertus et al. | 405/128 |
| 4,618,686 | 10/1986 | Boyer . | |
| 4,654,203 | 3/1987 | Maurer et al. . | |
| 5,162,600 | 11/1992 | Cody et al. . | |
| 5,457,272 | 10/1995 | Hooykaas | 588/250 |

FOREIGN PATENT DOCUMENTS

| 801033275 | 6/1980 | European Pat. Off. . |
| 3447337 | 12/1984 | Germany . |
| 8149461 | 4/1981 | Japan . |
| 8281689 | 5/1982 | Japan . |
| 82132059 | 7/1982 | Japan . |
| 85263640 | 11/1985 | Japan . |

OTHER PUBLICATIONS

Database WPI, Section Ch, Week 9807, Derwent Publications, Ltd., London, Great Britain; Class L02, AN 98-075450, XP002103958 & RU 2 081 079 C, (Salakhov, R.M.), Jun. 10, 1997 (Abstract).

*Primary Examiner*—Tom Dunn
*Assistant Examiner*—Elin A Warn

[57] ABSTRACT

Disclosed herein are a solid waste treatment agent comprising phosphorous acid or a derivative thereof and/or hypophosphorous acid or a derivative thereof, or phosphorous acid or a derivative thereof and/or hypophosphorous acid or a derivative thereof, and an aluminum compound and/or a titanium compound, and a method of treating solid waste, which comprises adding the solid waste treatment agent to solid waste containing harmful metals and/or organic chlorinated compounds such as dioxins and PCB to make the solid waste harmless. When the solid waste treatment agent comprising phosphorous acid or a derivative thereof and/or hypophosphorous acid or a derivative thereof, and titanium oxide, or comprising phosphorous acid or a derivative thereof and/or hypophosphorous acid or a derivative thereof, titanium oxide and an aluminum compound is used as a solid waste treatment agent to treat solid waste under irradiation of rays, the solid waste can be effectively made harmless even when the treatment is conducted at a relatively low temperature.

14 Claims, No Drawings

SOLID WASTE TREATMENT AGENT AND TREATMENT METHOD OF SOLID WASTE

BACKGROUND OF THE INVENTION

1. Field of the Invention

The present invention relates to solid waste treatment agents and a method of treating solid waste, by which harmful metals and organic chlorinated compounds such as dioxins and polychlorinated biphenyl (PCB) contained in solid waste such as incineration ash, smoke dust, slag, sludge, soil or shredder dust can be made harmless to facilitate handling in subsequent treatment steps of the solid waste.

2. Description of the Background Art

Various metal elements are contained in solid waste such as smoke dust generated in a refuse incineration ground, sludge exhausted from a mine, activated sludge used in a waste water treatment or contaminated soil, and heavy metal elements, such as mercury, cadmium, zinc, copper and chromium, harmful to the human body may be contained in plenty in many cases. When these metals are dissolved out of the solid waste, there is a possibility that underground water, rivers, seawater and the like may be contaminated.

Therefore, there has heretofore been adopted a treatment method in which solid waste is cemented and then buried in the ground. However, this method has a possibility that metals may be dissolved out in seawater or rainwater through a cement wall when the cemented solid waste comes into contact with the seawater or rainwater, and has hence not been always said to be a safe treatment method. A treatment method in which a metal scavenger is added to solid waste to immobilize metals, and the solid waste is then bound with cement or the like is also performed.

However, the method of immobilizing the metals in the solid waste by the metal scavenger has involved a problem that the reactivity of the metal scavenger to the metals in the solid waste is not always sufficient due to the low penetrating power of the metal scavenger into the solid waste, so that the metals contained in the solid waste may not be sufficiently immobilized in some cases. In addition, since the metal scavenger is difficult to immobilize calcium contained in the solid waste, and calcium not immobilized is easy to be dissolved out in water from the solid waste, there is a possibility that even when the solid waste treated with the metal scavenger is further bound with cement or the like to finally dispose it, unimmobilized calcium in the solid waste and calcium in the cement wall may be easy to be dissolved out when exposed to rain or the like, and not only the cement wall may become easy to be broken down as the calcium is dissolved out, but also other metals immobilized by the metal scavenger in the solid waste may become easy to be isolated. Further, it has heretofore been necessary to bind the solid waste with a great amount of cement or the like to treat it, which offers a problem to subsequent treatments and transfer, because the volume of the solid waste after bound with the cement or the like becomes larger than the treatment needs.

In recent years, the generation of dioxins upon refuse incineration has become a major social problem, and there is also a possibility that organic chlorinated compounds such as dioxins may be contained in smoke dust formed by refuse incineration. However, it has been difficult to make the organic chlorinated compounds such as dioxins in the smoke dust harmless by the conventional treatment methods. Further, in recent years, PCB widely used as a heat transfer medium or the like has not been used because it is harmful to the human body. However, soil and the like may possibly be contaminated with PCB discarded in some cases. It has however been said to be difficult to treat the soil and the like contaminated with PCB, since PCB is a thermally and chemically very stable compound.

In order to treat the organic chlorinated compounds such as dioxins, there has heretofore been adopted a method of treating them at a high temperature of at least 600° C. or a method of heat-treating them at 400° C. or higher in an atmosphere containing a low concentration of oxygen. However, these methods have involved a problem that a treating apparatus having excellent heat resistance or a special treating apparatus capable of keeping the atmosphere at a low oxygen concentration is required, and so plant and equipment investment is expensive.

SUMMARY OF THE INVENTION

The present invention has been completed in view of the foregoing circumstances, and has as its object the provision of a solid waste treatment agent and a method of treating solid waste, by which metals contained in solid waste, and solid waste containing organic chlorinated compounds such as dioxins and PCB can be made harmless with reliability.

According to the present invention, there is thus provided a solid waste treatment agent comprising phosphorous acid or a derivative thereof and/or hypophosphorous acid or a derivative thereof.

According to the present invention, there is also provided a solid waste treatment agent comprising phosphorous acid or a derivative thereof and/or hypophosphorous acid or a derivative thereof, and an aluminum compound and/or a titanium compound.

According to the present invention, there is further provided a solid waste treatment agent comprising phosphorous acid or a derivative thereof and/or hypophosphorous acid or a derivative thereof, an aluminum compound and/or a titanium compound, and at least one of a silicon compound, a vanadium compound, a molybdenum compound, a tungsten compound and a cerium compound.

According to the present invention, there is still further provided a solid waste treatment agent comprising titanium oxide, and phosphorous acid or a derivative thereof and/or hypophosphorous acid or a derivative thereof, wherein titanium oxide is mixed with phosphorous acid or the derivative thereof and/or hypophosphorous acid or the derivative thereof.

According to the present invention, there is yet still further provided a solid waste treatment agent comprising titanium oxide, and phosphorous acid or a derivative thereof and/or hypophosphorous acid or a derivative thereof, wherein phosphorous acid or the derivative thereof and/or hypophosphorous acid or the derivative thereof is supported on titanium oxide.

According to the present invention, there is yet still further provided a solid waste treatment agent comprising titanium oxide, an aluminum compound, and phosphorous acid or a derivative thereof and/or hypophosphorous acid or a derivative thereof, wherein titanium oxide is mixed with phosphorous acid or the derivative thereof and/or hypophosphorous acid or the derivative thereof.

According to the present invention, there is yet still further provided a solid waste treatment agent comprising titanium oxide, an aluminum compound, and phosphorous acid or a derivative thereof and/or hypophosphorous acid or a derivative thereof, wherein phosphorous acid or the derivative thereof and/or hypophosphorous acid or the derivative thereof is supported on titanium oxide.

The solid waste treatment agents according to the present invention may further comprise at least one of water glass, slaked lime, cement, an inorganic absorbent, a neutralizing agent, a metal scavenger, and phosphoric acid or a derivative thereof.

According to the present invention, there is yet still further provided a method of treating solid waste, which comprises adding any one of the solid waste treatment agents described above to the solid waste to make the solid waste harmless.

It may be preferred that upon the treatment of the solid waste, the solid waste be heated to a temperature ranging from 100 to 1,000° C. When the agent comprising titanium oxide, and phosphorous acid or the derivative thereof and/or hypophosphorous acid or the derivative thereof, or comprising titanium oxide, the aluminum compound, and phosphorous acid or the derivative thereof and/or hypophosphorous acid or the derivative thereof is used as a solid waste treatment agent to treat the solid waste under irradiation of rays, the treatment may be effectively conducted even at a relatively low temperature of room temperature to 600° C. When the treatment of the solid waste is conducted under the irradiation of rays, the rays irradiated may be rays having a wavelength of 450 nm or shorter, or rays containing rays having a wavelength of 450 nm or shorter.

DETAILED DESCRIPTION OF THE PREFERRED EMBODIMENTS

In the present invention, a phosphorous acid salt is used as the derivative of phosphorous acid. Examples of the phosphorous acid salt include sodium phosphate, potassium phosphate, calcium phosphite, magnesium phosphate, ammonium phosphate, sodium hydrogenphosphite, potassium hydrogenphosphite, calcium hydrogenphosphite and magnesium hydrogenphosphite. Of phosphorous acid and these phosphates, phosphorous acid, sodium phosphate and calcium phosphate are preferred. These compounds may be used either singly or in any combination thereof.

A hypophosphorous acid salt is used as the derivative of hypophosphorous acid. Examples of the hypophosphorous acid salt include sodium hypophosphite, potassium hypophosphite, calcium hypophosphite, magnesium hypophosphite and ammonium hypophosphite. Of hypophosphorous acid and these hypophosphites, hypophosphorous acid, sodium hypophosphite and calcium hypophosphite are preferred. These compounds may be used either singly or in any combination thereof. Phosphorous acid or the derivative thereof and hypophosphorous acid or the derivative thereof may be used either singly or in combination with each other. As phosphorous acid or the derivative thereof and/or hypophosphorous acid or the derivative thereof, there may be used a solution composed mainly of a waste solution from electroless nickel plating. The waste solution from electroless nickel plating may contain only one of phosphorous acid or the derivative thereof and hypophosphorous acid or the derivative thereof or both of them.

The solid waste treatment agents according to the present invention may contain an aluminum compound and/or a titanium compound together with phosphorous acid or the derivative thereof and/or hypophosphorous acid or the derivative thereof. Examples of the aluminum compound include aluminum sulfate, aluminum hydroxide, aluminum oxide, aluminum phosphate, aluminum nitrate and aluminosilica gel. Examples of the titanium compound include titanium oxide, titanium nitride and titanium sulfate. Of these compounds, aluminum phosphate, aluminum sulfate and titanium oxide are particularly preferred.

A mixing ratio of phosphorous acid or the derivative thereof and/or hypophosphorous acid or the derivative thereof to the aluminum compound and/or the titanium compound is preferably within a range of from 99.99:0.01 to 60:40 in terms of the weight ratio of phosphorous acid or the derivative thereof and/or hypophosphorous acid or the derivative thereof to the aluminum compound and/or the titanium compound. The combined use of phosphorous acid or the derivative thereof and/or hypophosphorous acid or the derivative thereof with the aluminum compound and/or the titanium compound can more enhance the effect of making dioxins harmless. When phosphorous acid or the derivative thereof and/or hypophosphorous acid or the derivative thereof is used in combination with the aluminum compound and/or the titanium compound, the above effect can be still more enhanced when at least one of a silicon compound, a vanadium compound, a molybdenum compound, a tungsten compound and a cerium compound is further used in combination.

Examples of the silicon compound include silicic acid, calcium silicate, sodium silicate, potassium silicate, sodium metasilicate, silicotungstic acid and sodium disilicate. Examples of the vanadium compound include vanadium oxide and vanadium oxysulfate. Examples of the molybdenum compound include molybdenum oxide, calcium molybdate, sodium molybdate, barium molybdate, phosphomolybdic acid and sodium phosphomolybdate. Examples of the tungsten compound include tungsten oxide, calcium tungstate, sodium tungstate, phosphotungstic acid and sodium phosphotungstate. Examples of the cerium compound include cerium oxide, cerium nitrate, cerium carbonate, cerium sulfate and cerium phosphate. In the case where at least one of these compounds is further used in combination with phosphorous acid or the derivative thereof and/or hypophosphorous acid or the derivative thereof, and the aluminum compound and/or the titanium compound, the amount of these compounds used is preferably 0.01 to 20 parts by weight per 100 parts by weight of phosphorous acid or the derivative thereof and/or hypophosphorous acid or the derivative thereof.

The solid waste treatment agents according to the present invention may be used in combination with at least one of secondary components such as water glass, slaked lime and cement. The secondary components are preferably used in combination in a proportion of 5 to 100 wt. % based on the weight of the solid waste treatment agent according to the present invention. Besides water glass, slaked lime and cement, an inorganic absorbent, a neutralizing agent, a metal scavenger, and phosphoric acid or a derivative thereof may be used as the secondary components.

Examples of the inorganic absorbent include zeolite, bentonite, activated clay and kaolin. Examples of the neutralizing agent include sulfuric acid and iron chloride. As the metal scavenger, there may be any conventionally-known metal scavenger having a functional group of, for example, the dithiocarbamic acid type or the thiourea type. Examples of the derivative of phosphoric acid include sodium phosphate, potassium phosphate, calcium phosphate and ammonium phosphate.

When these secondary components are used in combination, the effect of making solid waste harmless can be more enhanced due to the immobilization of metals in the solid waste. The neutralizing agent is effective for the treatment of alkaline solid waste.

In the method of the present invention, the temperature at which the treatment agent is added to solid waste to treat it is preferably within a range of from 100 to 1,000° C., particularly from 150 to 900° C. When the treatment agent according to the present invention is added to solid waste to heat-treat it at a temperature of 100 to 1,000° C., harmful metals in the solid waste are metallized and made hard to be dissolved out. In addition, decomposition of organic chlorinated compounds such as dioxins is facilitated, and so the effect of making the solid waste harmless is enhanced. It is hence preferred to treat the solid waste by such a treatment method. In the case where the harmful metals are metallized and made hard to be dissolved out, it is preferred that the treating temperature be as high as possible. When the treatment is conducted at a high temperature exceeding 600° C., however, high heat resistance is required of a treating apparatus used, and so the plant and equipment investment in the treating apparatus is expensive. In order to solve such a problem, the solid waste treatment agent comprising phosphorous acid or the derivative thereof and/or hypophosphorous acid or the derivative thereof, and titanium oxide, or comprising phosphorous acid or the derivative thereof and/or hypophosphorous acid or the derivative thereof, titanium oxide and the aluminum compound is used to treat the solid waste under irradiation of rays. According to such a treatment method, the treatment can be effectively conducted even at a relatively low temperature of room temperature to 600° C. Even in this case, a more effective treatment is feasible when the solid waste is treated at 600 to 1,000°, preferably 600 to 900° C. if a high-temperature resistant treating apparatus is installed.

In the case where the solid waste treatment agent comprising phosphorous acid or the derivative thereof and/or hypophosphorous acid or the derivative thereof, and titanium oxide, or comprising phosphorous acid or the derivative thereof and/or hypophosphorous acid or the derivative thereof, titanium oxide and the aluminum compound is used as a solid waste treatment agent, phosphorous acid or the derivative thereof and/or hypophosphorous acid or the derivative thereof may be either mixed with titanium oxide or supported on titanium oxide. In the case where such a solid waste treatment agent is used, a proportion of phosphorous acid or the derivative thereof and/or hypophosphorous acid or the derivative thereof to titanium oxide is preferably within a range of from 5:95 to 95:5, particularly from 15:85 to 85:15 in terms of the weight ratio of phosphorous acid or the derivative thereof and/or hypophosphorous acid or the derivative thereof to titanium oxide.

In the case where the solid waste is treated with the solid waste treatment agent containing titanium oxide under the irradiation of rays, the rays are preferably ultraviolet rays or rays containing ultraviolet rays. The ultraviolet rays may be either natural ultraviolet rays or artificial ultraviolet rays. Sunrays containing ultraviolet ray in plenty may be used. However, ultraviolet rays having a wavelength of 450 nm or shorter, or rays containing ultraviolet rays having a wavelength of 450 nm or shorter are particularly preferred.

The amount of the treatment agent according to the present invention added to solid waste varies according to the amount of heavy metals contained in the solid waste. In most cases, however, the treatment agent is preferably added in such a manner that the amount of phosphorous acid or the derivative thereof and/or hypophosphorous acid or the derivative thereof added (or in the case where phosphorous acid or the derivative thereof and/or hypophosphorous acid or the derivative thereof is used in combination with the aluminum compound and/or the titanium compound, the amount of the mixture added) amounts to 0.01 to 50 wt. % of the solid waste.

Examples of the solid waste to be treated with the treatment agents according to the present invention include incineration ash and smoke dust generated in refuse incineration grounds, slag, sludge, soil, and shredder dust. Since the method of the present invention comprises adding the treatment agent according to the present invention to these kinds of solid waste and kneading them, thereby making the solid waste harmless, harmful heavy metals contained in the solid waste can be effectively made harmless by conducting a mere simple operation. Smoke dust containing harmful dioxins, soil contaminated with organic chlorinated compounds such as dioxins and PCB, and the like may also be made harmless with ease. In the method of the present invention, the treatment agent according to the present invention may be added to the solid waste in a state dispersed or dissolved in water, as needed, to knead them, or water may be added to the solid waste together with the treatment agent according to the present invention. In the case where water is used in combination with the treatment agent according to the present invention, the amount of water added is preferably about 1 to 500 wt. % based on the weight of phosphorous acid or the derivative thereof and/or hypophosphorous acid or the derivative thereof.

The solid waste treated by the method of the present invention may be buried in the ground as it is to finally dispose it, or bound with cement as needed to finally dispose it, since the harmful metals contained therein is prevented from being dissolved out, and the organic chlorinated compounds are made harmless to the fullest extent. The solid waste after treated with the treatment agent according to the present invention may also be finally disposed by further adding a known heavy metal scavenger to the solid waste to bury it in the ground, or by binding the solid waste with cement to bury it in the ground. In the case where the final disposal is conducted by, for example, binding the solid waste with cement or the like to bury it in the ground, the solid waste treated by the method of the present invention scarcely incurs the possibility that metals in the solid waste may be dissolved out again to cause secondary contamination, even when the amount of cement used is less compared with the conventional methods.

The present invention will hereinafter be described more specifically by the following examples.

EXAMPLES 1 to 10 AND COMPARATIVE EXAMPLE 1

A treatment of solid waste was conducted by separately adding treatment agents of their corresponding compositions shown in Table 1 in such a manner that the amount of phosphorous acid or a derivative thereof and/or hypophosphorous acid or a derivative thereof (or a mixture of phosphorous acid or a derivative thereof and/or hypophosphorous acid or a derivative thereof with an aluminum compound and/or a titanium compound) added amounts to 10 g (in terms of the weight of anhydride) per 100 g of smoke dust containing 0.8 g/kg of zinc, 1.2 g/kg of lead, 0.05 g/kg of cadmium, 430 g/kg of calcium and 250 ng/g of dioxins, and aging each mixture at 150° C. for 2 hours in a rotary kiln. Each 50 g of the smoke dust treated with each treatment agent and untreated smoke dust were immersed at room temperature for 6 hours in 500 ml of purified water to test the smoke dust as to whether metals were dissolved out or not. The concentrations of metals dissolved out in the purified water were measured by atomic absorption spectrometry. The results are shown in Table 1. The concentrations of dioxins in the treated smoke dust and the untreated smoke dust were also measured. The results are shown collectively in Table 1.

TABLE 1

| | Composition of treatment agent | Concentration of metals dissolved out (mg/l) | | | Conc. of dioxins (ng/g) |
|---|---|---|---|---|---|
| | | Zn | Pb | Cd | |
| Ex. 1 | Sodium phosphite 100 wt. % | 0.2 | 0.05 | 0.06 | 101 |
| Ex. 2 | Ammonium hypophosphite 100 wt. % | <0.01 | 0.03 | 0.01 | 110 |
| Ex. 3 | Potassium phosphite 30 wt. % Potassium hypophosphite 70 wt. % | <0.01 | 0.01 | 0.03 | 105 |
| Ex. 4 | Calcium phosphite 100 wt. % | 0.3 | 0.05 | 0.07 | 120 |
| Ex. 5 | Sodium phosphite 60 wt. % Sodium hypophosphite 40 wt. % | <0.01 | 0.06 | <0.01 | 107 |
| Ex. 6 | Phosphorous acid 30 wt. % Sodium phosphite 70 wt. % | <0.01 | 0.04 | <0.01 | 98 |
| Ex. 7 | Magnesium hypophosphite 25 wt. % Sodium hypophosphite 75 wt. % | 0.2 | 0.02 | 0.05 | 117 |
| Ex. 8 | Sodium phosphite 75 wt. % Aluminum phosphate 25 wt. % | <0.01 | 0.04 | 0.02 | 97 |
| Ex. 9 | Calcium hypophosphite 75% Titanium oxide 25 wt. % | 0.3 | 0.03 | 0.03 | 99 |
| Ex. 10 | Calcium phosphite 85 wt. % Aluminun sulfate 15 wt. % | <0.01 | 0.05 | <0.01 | 102 |
| Comp. Ex. 1 | Sodium dimethyldithiocarbamate 100 wt. % | 0.4 | 0.8 | 0.09 | 215 |
| | Untreated smoke dust | 5.9 | 18.6 | 0.10 | 220 |

EXAMPLES 11 to 20 AND COMPARATIVE EXAMPLE 2

A treatment of solid waste was conducted by adding each of treatment solutions obtained by separately dissolving each 100 parts by weight of treatment agents of their corresponding compositions shown in Table 2 in 15 parts by weight of water in such a manner that the amount of phosphorous acid or a derivative thereof and/or hypophosphorous acid or a derivative thereof (or a mixture of phosphorous acid or a derivative thereof and/or hypophosphorous acid or a derivative thereof with an aluminum compound and/or a titanium compound) added amounts to 20 g (in terms of the weight of anhydride) per 100 g of slag containing 2.4 g/kg of lead, 0.69 g/kg of zinc, 0.06 g/kg of cadmium, 0.48 g/kg of nickel, 3.16 g/kg of copper, 1.3 g/kg of chromium and 0.2 g/kg of calcium, and kneading each mixture at 60° C. for 15 minutes. Each 50 g of the slag treated with each treatment agent and untreated slag were used to test the slag as to whether metals were dissolved out or not in the same manner as in Examples 1 to 10. The concentrations of metals dissolved out were measured by atomic absorption spectrometry. The results are shown in Table 2.

TABLE 2

| | Composition of treatment agent | Concentration of metals dissolved out (mg/l) | | | | | |
|---|---|---|---|---|---|---|---|
| | | Pb | Zn | Cd | Ni | Cu | Cr |
| Ex. 11 | Hypophosphorous acid 100 wt. % | 0.09 | 0.9 | 0.05 | 0.9 | 1.3 | 0.2 |
| Ex. 12 | Phosphorous acid 100 wt. % | 0.11 | 0.8 | 0.06 | 0.5 | 1.6 | 0.5 |
| Ex. 13 | Sodium phosphite 40 wt. % Sodium hypophosphite 60 wt. % | 0.12 | 0.6 | 0.02 | 0.7 | 1.0 | 0.4 |
| Ex. 14 | Calcium hypophosphite 100 wt. % | 0.21 | 0.2 | 0.04 | 0.2 | 1.4 | 0.1 |
| Ex. 15 | Potassium phosphite 70 wt. % Potassium hypophosphite 30 wt. % | 0.18 | 0.7 | 0.07 | 0.8 | 1.9 | 0.7 |
| Ex. 16 | Magnesium phosphite 50 wt. % Magnesium hypophosphite 50 wt. % | 0.19 | 0.5 | 0.03 | 0.6 | 1.5 | 0.3 |
| Ex. 17 | Hypophosphorous acid 80 wt. % Sodium hypophosphite 20 wt. % | 0.12 | 0.3 | 0.05 | 0.6 | 1.7 | 0.6 |
| Ex. 18 | Calcium phosphite 75 wt. % Aluminum oxide 25 wt. % | 0.25 | 0.2 | 0.02 | 0.3 | 1.2 | 0.2 |
| Ex. 19 | Phosphorous acid 50 wt. % Alumium hydroxide 50 wt. % | 0.15 | 0.5 | 0.04 | 0.5 | 1.5 | 0.5 |
| Ex. 20 | Calcium hypophosphite 90 wt. % Aluminum sulfate 5 wt. % Cerium phosphate 5 wt. % | 0.22 | 0.4 | 0.05 | 0.6 | 1.7 | 0.1 |
| Comp. Ex. 2 | Sodium dimethyldithio carbamate 100 wt. % | 0.34 | 1.0 | 0.13 | 1.4 | 2.8 | 1.1 |
| | Untreated slag | 1.2 | 3.6 | 0.9 | 2.4 | 2.8 | 3.1 |

EXAMPLES 21 to 30 AND COMPARATIVE EXAMPLE 3

A treatment of solid waste was conducted by separately adding treatment agents of their corresponding compositions shown in Table 3 in a proportion of 10 g per 100 g of soil containing 85 mg/kg of chromium, 16 mg/kg of copper, 37 mg/kg of cadmium, 54 mg/kg of zinc, 109 mg/kg of lead and 330 ng/g of dioxins, aging each mixture at 300° C. for 40 minutes in a rotary kiln and then cooling it. Each 50 g of the soil treated with each treatment agent and untreated soil were used to test the soil as to whether metals were dissolved out or not in the same manner as in Examples 1 to 10. The concentrations of metals dissolved out were measured by atomic absorption spectrometry. The results are shown in Table 3. The concentrations of dioxins in the treated soil and the untreated soil were also measured. The results are shown collectively in Table 3.

TABLE 3

| | Composition of treatment agent | Concentration of metals dissolved out (mg/l) | | | | | Conc. of dioxins (ng/g) |
|---|---|---|---|---|---|---|---|
| | | Cr | Cu | Cd | Zn | Pb | |
| Ex. 21 | Calcium hypophosphite 100 wt. % | 0.1 | 0.2 | 0.01 | <0.01 | 0.02 | 0.051 |
| Ex. 22 | Ammonium phosphite 100 wt. % | 0.2 | <0.05 | 0.04 | 0.6 | 0.03 | 0.042 |
| Ex. 23 | Sodium phosphite 40 wt. % Sodium hypophosphite 60 wt. % | 0.2 | <0.05 | 0.02 | <0.01 | 0.06 | 0.033 |
| Ex. 24 | Potassium hypophosphite 100% | 0.3 | <0.05 | 0.03 | 0.1 | 0.01 | 0.026 |
| Ex. 25 | Potassium phosphite 20 wt. % Potassium hypophosphite 80 wt. % | 0.3 | 0.2 | 0.03 | <0.01 | 0.07 | 0.048 |
| Ex. 26 | Magnesium phosphite 70 wt. % Magnesium hypophosphite 30 wt. % | 0.1 | 0.5 | 0.02 | <0.01 | 0.04 | 0.055 |
| Ex. 27 | Calcium phosphite 90 wt. % Magnesium hypophosphite 10 wt. % | 0.4 | <0.05 | <0.01 | 0.3 | 0.05 | 0.083 |
| Ex. 28 | Calcium hypophosphite 85 wt. % Titanium oxide 14 wt. % Vanadium oxide 1 wt. % | 0.3 | <0.05 | <0.01 | 0.2 | 0.03 | 0.065 |
| Ex. 29 | Potassium phosphite 90 wt. % Aluminum sulfate 5 wt. % Cerium phosphate 5 wt. % | <0.05 | <0.05 | <0.01 | <0.01 | 0.01 | 0.035 |
| Ex. 30 | Ammonium phosphite 85 wt. % Aluminum phosphite 15 wt. % | 0.1 | <0.05 | 0.04 | <0.01 | 0.03 | 0.045 |
| Comp. Ex. 3 | Sodium dimethyldithio-carbamate 100 wt. % | 0.5 | 0.6 | 0.05 | 0.7 | 0.08 | 270 |
| | Untreated soil | 1.2 | 1.3 | 0.58 | 1.56 | 3.54 | 293 |

EXAMPLES 31 to 40 AND COMPARATIVE EXAMPLE 4

A treatment of solid waste was conducted by separately adding, together with 10 g of water, treatment agents of their corresponding compositions shown in Table 4 in such a manner that the amount of the treatment agent amounts to 10 g (in terms of the weight of anhydride) per 100 g of smoke dust containing 2,200 mg/kg of lead, 0.1 mg/kg of mercury, 50 mg/kg of cadmium and 3.7 ng/g of dioxins, and aging each mixture at 150° C. for 2 hours in a rotary kiln equipped with an apparatus capable of irradiating with rays having a wavelength of 450 nm or shorter. Each 50 g of the smoke dust treated with each treatment agent and untreated smoke dust were used to test the smoke dust as to whether metals were dissolved out or not in the same manner as in Examples 1 to 10. The concentrations of metals dissolved out in purified water were measured by atomic absorption spectrometry. The results are shown in Table 4. The concentrations of dioxins in the treated smoke dust and the untreated smoke dust were also measured. The results are shown collectively in Table 4. Incidentally, the treatment agents used in Examples 31 to 36 are mixtures of titanium oxide with phosphorous acid or a derivative thereof and/or hypophosphorous acid or a derivative thereof, while the treatment agents used in Examples 37 to 40 are those that phosphorous acid or a derivative thereof and/or hypophosphorous acid or a derivative thereof is supported on titanium oxide.

TABLE 4

| | Composition of treatment agent | Concentration of metals dissolved out (mg/l) | | | Conc. of dioxins (ng/g) |
|---|---|---|---|---|---|
| | | Zn | Pb | Cd | |
| Ex. 31 | Sodium phosphite 90 wt. % Titanium oxide 10 wt. % | 0.1 | <0.0005 | <0.05 | 0.05 |
| Ex. 32 | Ammonium hypophosphite 50 wt. % Titanium oxide 50 wt. % | 0.1 | 0.001 | <0.05 | 0.03 |
| Ex. 33 | Potassium phosphite 30 wt. % Potassium hypophosphite 50 wt. % Titanium oxide 20 wt. | <0.05 | 0.001 | <0.05 | 0.02 |
| Ex. 34 | Calcium phosphite 30 wt. % Titanium oxide 70 wt. % | 0.2 | 0.004 | <0.05 | 0.01 |
| Ex. 35 | Sodium phosphite 20 wt. % Sodium hypophosphite 10 wt. % Titanium oxide 70 wt. % | 0.2 | 0.004 | <0.05 | 0.02 |
| Ex. 36 | Phosphorous acid 10 wt. % Sodium phosphite 40 wt. % Titanium oxide 50 wt. % | <0.05 | <0.0005 | <0.05 | 0.008 |
| Ex. 37 | Magnesium hypophosphite 20 wt. % Sodium hypophosphite 40 wt. % Titanium oxide 40 wt. % | 0.1 | <0.0005 | <0.05 | 0.03 |
| Ex. 38 | Sodium phosphite 50 wt. % Titanium oxide 50 wt. % | 0.1 | <0.0005 | <0.05 | 0.02 |
| Ex. 39 | Calcium hypophosphite 70 wt. % Titanium oxide 30 wt. % | <0.05 | <0.0005 | <0.05 | 0.03 |
| Ex. 40 | Calcium phosphite 60 wt. % Titanium oxide 40 wt. % | 0.1 | <0.0005 | <0.05 | 0.01 |
| Comp. Ex. 4 | Sodium dimethyldithio-carbamate 100 wt. % | <0.05 | 0.004 | <0.05 | 2.8 |
| | Untreated smoke dust | 10 | 0.009 | 0.02 | 3.7 |

EXAMPLES 41 to 50 AND COMPARATIVE EXAMPLE 5

A treatment of solid waste was conducted by separately adding treatment agents of their corresponding compositions shown in Table 5 in a proportion of 10 g per 100 g of soil containing 1.5 mg/kg of chromium, 0.1 mg/kg of cadmium, 1.7 mg/kg of lead and 65 ng/g of PCB, aging each mixture at 300° C. for 40 minutes in a rotary kiln and then cooling it. Each 50 g of the soil treated with each treatment agent and untreated soil were used to test the soil as to whether metals were dissolved out or not in the same manner as in Examples 1 to 10. The concentrations of metals dissolved out were measured by atomic absorption spectrometry. The results are shown in Table 5. The concentrations of PCB in the treated soil and the untreated soil were also measured. The results are shown collectively in Table 5. Incidentally, the treatment agents used in Examples 41 to 46 are mixtures of titanium oxide with phosphorous acid or a derivative thereof and/or hypophosphorous acid or a derivative thereof, while the treatment agents used in Examples 47 to 50 are those that phosphorous acid or a derivative thereof and/or hypophosphorous acid or a derivative thereof is supported on titanium oxide.

TABLE 5

| | Composition of treatment agent | Concentration of metals dissolved out (mg/l) | | | Conc. of PCB (ng/g) |
|---|---|---|---|---|---|
| | | Cr | Cd | Pb | |
| Ex. 41 | Calcium hypophosphite 70 wt. % Titanium oxide 30 wt. % | <0.01 | <0.005 | <0.005 | 0.008 |
| Ex. 42 | Ammonium phosphite 50 wt. % Titanium oxide 50 wt. % | <0.01 | <0.005 | <0.005 | 0.01 |
| Ex. 43 | Sodium phosphite 10 wt. % Sodium hypophosphite 20 wt. % Titanium oxide 70 wt. % | <0.01 | <0.005 | <0.005 | 0.01 |
| Ex. 44 | Calcium hypophosphite 60 wt. % Titanium oxide 40 wt. % | <0.01 | <0.005 | <0.005 | 0.009 |
| Ex. 45 | Potassium phosphite 20 wt. % potassium hypophosphite 30 wt. % Titanium oxide 50 wt. % | <0.01 | <0.005 | <0.005 | 0.02 |
| Ex. 46 | Magnesium phosphite 10 wt. % Magnesium hypophosphite 10 wt. % Titanium oxide 80 wt. % | <0.01 | <0.005 | 0.1 | 0.03 |
| Ex. 47 | Calcium phosphite 30 wt. % Magnesium hypophosphite 10 wt. % Titanium oxide 60 wt. % | <0.01 | <0.005 | 0.1 | 0.02 |
| Ex. 48 | Calcium hypophosphite 50 wt. % Titanium oxide 50 wt. % | <0.01 | <0.005 | <0.005 | 0.01 |
| Ex. 49 | Potassium phosphite 50 wt. % Titanium oxide 50 wt. % | <0.01 | <0.005 | <0.005 | 0.01 |
| Ex. 50 | Ammonium phosphite 70 wt. % Titanium oxide 30 wt. % | <0.01 | <0.005 | <0.005 | 0.008 |
| Comp. Ex. 5 | Sodium dimethyldithiocarbamate 100 wt. % | 0.08 | <0.005 | 0.01 | 63 |
| | Untreated soil | 0.10 | 0.01 | 0.020 | 65 |

As described above, the solid waste treatment agents according to the present invention can surely make harmful metals and organic chlorinated compounds such as dioxins and PCB in solid waste harmless. When solid waste treated by the method according to the present invention is finally disposed by binding it with cement or the like as needed, the solid waste does not incur the possibility that metals in the solid waste may be dissolved out again to cause secondary contamination, even when the amount of cement used is decreased. The solid waste treated by the method according to the present invention does not need to bind with cement or the like. Even if the solid waste is bound with cement or the like, the amount of the cement or the like can be decreased. Therefore, the bulk thereof can be made smaller compared with the conventional methods, which brings about such effects that its transfer to subsequent treatment steps, and treating operations become very easy. In addition, when a method in which the solid waste treatment agent comprising phosphorous acid or the derivative thereof and/or hypophosphorous acid or the derivative thereof, and titanium oxide, or comprising phosphorous acid or the derivative thereof and/or hypophosphorous acid or the derivative thereof, titanium oxide and the aluminum compound is used as a solid waste treatment agent to treat solid waste under irradiation of rays is adopted, the solid waste can be effectively made harmless even when the treatment is conducted at a temperature as low as room temperature to 600° C. compared with the conventional methods.

What is claimed is:

1. A solid waste treatment agent comprising: phosphorous acid or a derivative thereof and/or hypophosphorous acid or a derivative thereof, an aluminum compound and/or a titanium compound, and at least one of a silicon compound, a vanadium compound, a molybdenum compound, a tungsten compound and a cerium compound.

2. A solid waste treatment agent comprising: titanium oxide, and phosphorous acid or a derivative thereof and/or hypophosphorous acid or a derivative thereof, wherein titanium oxide is mixed with phosphorous acid or the derivative thereof and/or hypophosphorous acid or the derivative thereof.

3. A solid waste treatment agent comprising: titanium oxide, and phosphorous acid or a derivative thereof and/or hypophosphorous acid or a derivative thereof, wherein phosphorous acid or the derivative thereof and/or hypophosphorous acid or the derivative thereof is supported on titanium oxide.

4. A solid waste treatment agent comprising: titanium oxide, an aluminum compound, and phosphorous acid or a derivative thereof and/or hypophosphorous acid or a derivative thereof, wherein titanium oxide is mixed with phosphorous acid or the derivative thereof and/or hypophosphorous acid or the derivative thereof.

5. A solid waste treatment agent comprising: titanium oxide, an aluminum compound, and phosphorous acid or a derivative thereof and/or hypophosphorous acid or a derivative thereof, wherein phosphorous acid or the derivative thereof and/or hypophosphorous acid or the derivative thereof is supported on titanium oxide.

6. The solid waste treatment agent according to any one of claims 1 to 5, which further comprises at least one of water glass, slaked lime, cement, an inorganic absorbent, a neutralizing agent, a metal scavenger, and phosphoric acid or a derivative thereof.

7. A method of treating solid waste, which comprises adding the solid waste treatment agent according to claim 6 to the solid waste to make the solid waste harmless.

8. The method according to claim 7, wherein the solid waste treatment agent is added to the solid waste, and the solid waste is heated to a temperature ranging from 100 to 1000° C. to treat it.

9. A method of treating solid waste, which comprises adding the solid waste treatment agent according to any one of claims 1 to 6 to the solid waste to make the solid waste harmless.

10. The method according to claim 9, wherein the solid waste treatment agent is added to the solid waste, and the solid waste is heated to a temperature ranging from 100 to 1,000° C. to treat it.

11. A method of treating solid waste, which comprises adding the solid waste treatment agent according to any one of claims 2 to 5 to treat the solid waste under irradiation of rays, thereby making the solid waste harmless.

12. The method according to claim 11, wherein the solid waste is treated under the irradiation of rays having a wavelength of 450 nm or shorter, or rays containing rays having a wavelength of 450 nm or shorter.

13. The method according to claim 12, wherein the solid waste is treated at room temperature to 600° C.

14. The method according to claim 11, wherein the solid waste is treated at room temperature to 600° C.

* * * * *